United States Patent [19]

Rolan

[11] Patent Number: 4,827,997

[45] Date of Patent: May 9, 1989

[54] PROTECTIVE COVER

[76] Inventor: Rolan, 2019 Red Rose Way, #1, Santa Barbara, Calif. 93109

[21] Appl. No.: 188,836

[22] Filed: May 2, 1988

Related U.S. Application Data

[62] Division of Ser. No. 82,511, Aug. 7, 1987.

[51] Int. Cl.$^4$ ............................................. B60J 11/00
[52] U.S. Cl. .................................................... 150/166
[58] Field of Search ........................... 150/52 K, 52 R

[56] References Cited

U.S. PATENT DOCUMENTS

| | | | |
|---|---|---|---|
| 2,801,667 | 8/1957 | Curran | 150/52 K |
| 2,874,709 | 2/1959 | Cohen et al. | 150/52 K X |
| 4,458,738 | 7/1984 | Wilson | 150/52 K X |
| 4,531,560 | 7/1985 | Balanky | 150/52 K |
| 4,589,459 | 5/1986 | Lantrip | 150/52 K |

FOREIGN PATENT DOCUMENTS

| | | | |
|---|---|---|---|
| 229516 | 11/1959 | Australia | 150/52 K |
| 998678 | 9/1951 | France | 150/52 K |
| 513435 | 10/1939 | United Kingdom | 150/52 K |

Primary Examiner—William Price
Attorney, Agent, or Firm—Christie, Parker & Hale

[57] ABSTRACT

A lightweight cover for a shaped object such as an automobile for protecting the object from the environment comprising a plurality of panels of lightweight, impermeable sheet material having the edges joined to form an enclosure. The sheet material is preferably a laminate of a film of reflective metal between an outer layer of transparent resin such as Mylar or polyethylene and an inner layer of resin, preferably color coded. The laminate may optionally contain a layer of scrim reinforcement. Water trapped between the cover and the surface of the object is selectively exhausted by means of vents having a flap which opens in response to gas pressure developed on evaporation of the trapped water vapor and normally remains closed to prevent entry of rain, dust, sap or other substances harmful to the finish of the automobile stored under the cover.

16 Claims, 3 Drawing Sheets

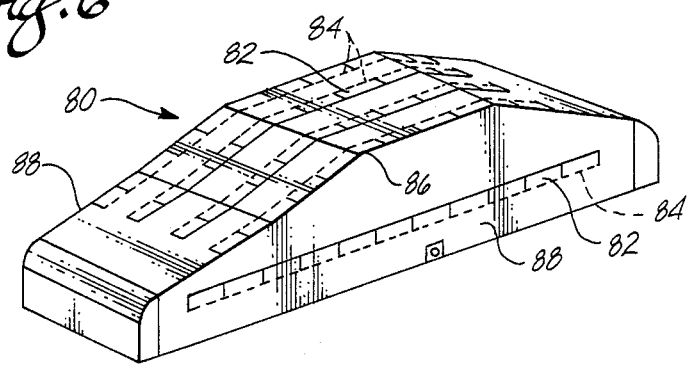
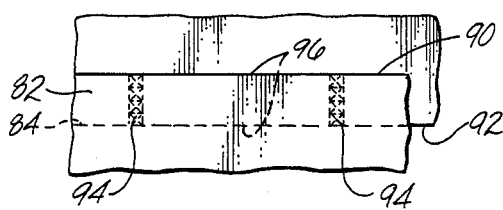
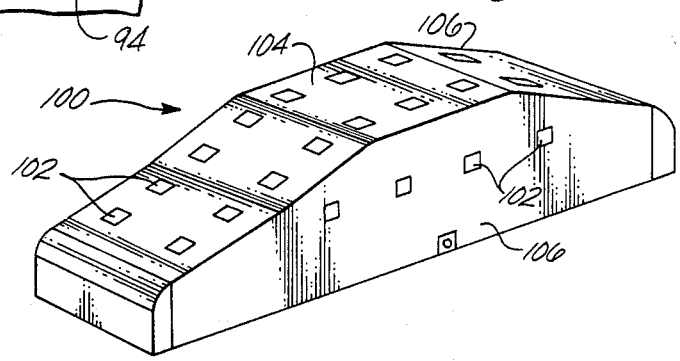
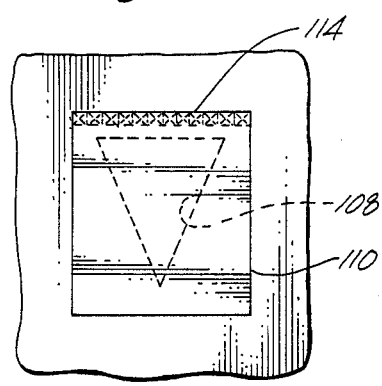
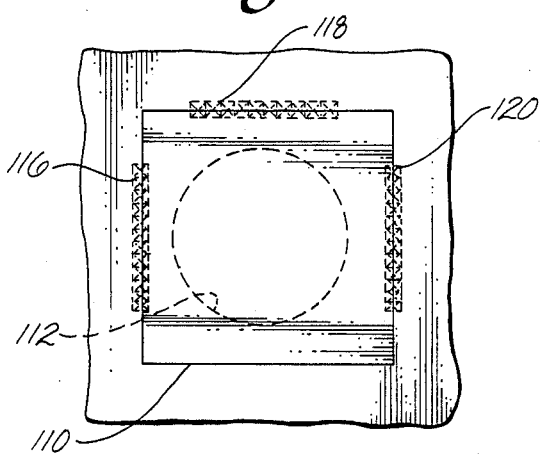

PROTECTIVE COVER

This application is a division of U.S. patent application Ser. No. 082,511 filed Aug. 7, 1987.

DESCRIPTION

1. Technical Field

This invention relates to a light-weight, flexible cover protecting objects such as automobiles from the environment and, more particularly, to a flexible, vented, reflective cover for a car.

2. Background of the Invention

There are many valuable products such as harvested agricultural products, finished articles being carried in the bed of a truck of manufactured articles such as automobiles that will be damaged or deteriorate when exposed to the forces of environment such as wind, rain and especially the short- and long-term effects of solar radiation. Furthermore, deposits of dew or dust particles from from the air onto a car finish can also cause deterioration by scratching or spotting the finish. One way to protect these articles or objects is to place them in an enclosure such as a garage for an automobile, a covered trailer for a truck chassis, or a silo or barn for harvested agricultural products. However, there are many occasions when there is not time to, nor is it cost-effective to place the article or object in a fixed, hard enclosure.

Flexible covers have been developed such as flat tarpaulins, or shaped, flexible covers such as car covers. Impermeable materials will collect moisture under the cover and would rot agricultural products and could cause discoloration of the finishes of automobiles. Woven canvas type covers tend to be fairly heavy and dust particles can become embedded in the inside surface of the cover and can cause scratching of the finish. Furthermore, light colored covers tend to become stained and discolored and dark colored covers absorb heat and heat the covered object such as a car to a very high temperature so that it is uncomfortable to enter after the cover is removed. These covers are bulky and heavy and hard to store and if prepared of natural fibers, they tend to deteriorate in the environment. Thus, the currently available automobile covers are made of porous materials. They are unable to protect the automobile from the heat generated by the sun and from the effects of ultraviolet rays. Porous covers permit the permeation of moisture from rain and snow, or salts from ocean spray, or fog, and dirt and dust, tree leaves and sap, bird droppings and the permeation of aggressive gases in the air such as sulfuric and nitrous acids through the cover onto the finish of the covered automobile or other covered object.

| List of Prior References: PATENT NO. | PATENTEE |
| --- | --- |
| 2,787,311 | Cohen et al |
| 2,874,709 | Cohen et al |
| 2,994,356 | Fleming |
| 3,328,073 | Einhorn |
| 3,763,908 | Norman |
| 3,910,330 | Johnson et al |
| 3,992,053 | Hrytak et al |
| 4,209,197 | Fischer |
| 4,290,644 | Hu et al |
| 4,531,560 | Balanky |
| 4,589,459 | Lantrip |
| 4,612,967 | Kamen et al |

| -continued List of Prior References: PATENT NO. | PATENTEE |
| --- | --- |
| 4,657,298 | Yong |
| 4,668,007 | Sloan |

Johnson et al discloses a car cover in which embossed vinyl is backed with cotton felt. Cohen et al (U.S. Pat. No. 2,874,709) discloses a car cover with a series of vent holes 32 formed around the periphery of the cover near the top window line. Cohen et al also shows a flap 34 to cover a zipper. The other Cohen patent discloses a car cover formed of light-weight plastic as does the Norman patent. Kamen's and Fleming's car covers include strips for protecting the sides of the vehicles. Hrytzak and Yong deploy a car shade from a roller. Lantrip and Fischer connect several panels to form an auto protector. Hu discloses a vented motorcycle seat cover; Sloan, a cover secured by tightening a cable; Einhorn, a shell for a convertible and Balanky, a cover for a pickup truck.

STATEMENT OF THE INVENTION

A light-weight, flexible, soft protective cover is provided in accordance with the invention. The cover is vapor-impermeable to the exterior environment but yet allows release of any moisture that collects under the cover or between the cover and object to be protected. The cover of the invention is reflective to solar, infrared and ultraviolet radiation, thus, protecting the object that is covered from the effects of these types of radiation and also maintaining the area enclosed by the cover at a substantially lower temperature. The inside surface of the cover of the invention is smooth and does not embed particles and provides protection from marring the finish of the object such as an automobile.

The light-weight protective cover of the invention is in the form of a shaped cover made out of a vapor-impermeable, reflective film having a smooth internal surface and being provided with a plurality of unidirectional vents. The vents are designed to close the vent to the exterior so as to prevent ingress of moisture, rain or other vapors or dust particles from the outside into the interior area or volume enclosed by the cover while allowing the vent to selectively open to release vapor pressure developed by the enclosure. The inward directional vent may take the form of very small holes in the exterior, hydrophobic surface which do not allow liquid moisture to penetrate into the enclosure while allowing gas pressure developed inside to vent through the holes. A preferred form of the selective vent or inward directional vent takes the form of a vent aperture covered by a hinged flap. The flap acts as a one-way valve. It prevents moisture or solid particles from entering the cover and precipitating on the object stored in the enclosure. When vapor entrained within the cover is vaporized, steam pressure will force the vent to open and allows the moisture to exhaust from the interior. When the pressure is released, the flap will return to its closed condition.

Other features of the invention reside in the use of a metalized film to provide total reflection of radiation and maintaining the enclosure at a substantially lower temperature. The cover may also be provided with means for locking the cover to an automobile. The covers can be provided in a plurality of coded colors so that the covers can be easily sorted depending on the characteristics of size or shape of a vehicle. Another optional feature is the provision of a soft, hydrophilic backing such as cotton. The cotton will provide soft, cushioning surface finish and also will provide a wicking surface to remove the moisture from the finish and hold it unitl it is vaporized and the vapors can move toward a vent. The film material from which the cover is made can include a reinforcement material such as a scrim of natural or synthetic fibers to provide some more shape and drape to the film material and to keep it from stretching.

The protective cover of the invention can be used wherever protection is needed from weather and sun. It can be used to protect vehicles such as cars, trucks, boats, recreational vehicles, motorcycles or airplanes. The covers can also be used to cover trucks of farm produce such as fruits and vegetables being hauled from the field to the market. The covers can also be used for agricultural storage such as to cover hay bales in the field.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 6 is a perspective view of a further embodiment of the vented, protective cover;

FIG. 7 is an enlarged partial view in elevation of a vent useful in the vented, protective cover illustrated in FIG. 6;

FIG. 8 is a perspective view of another configuration of the protective cover of the invention;

FIG. 9 is an enlarged partial view in elevation of a first form of a vent for use in the cover illustrated in FIG. 8; and FIG. 10 is an enlarged partial view in elevation of another form of a vent for the cover illustrated in FIG. 8.

DETAILED DESCRIPTION OF THE INVENTION

Figure 1:
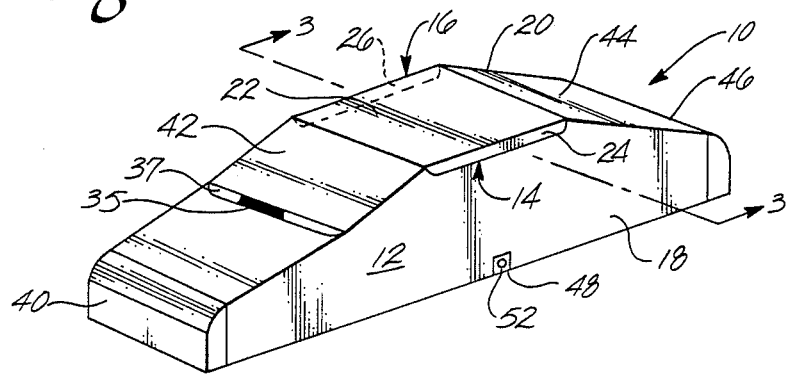
FIG. 1 is a perspective view of a first embodiment of a vented, protectie cover in accordance with the invention.
Figure 2A:
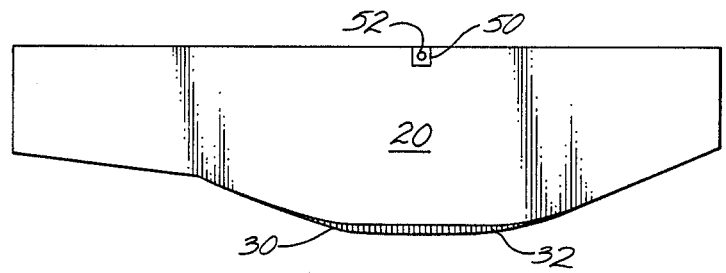
FIGS. 2a to 2c is a plan view of the panels for forming the cover illustrated in FIG. 1.
Figure 2B:
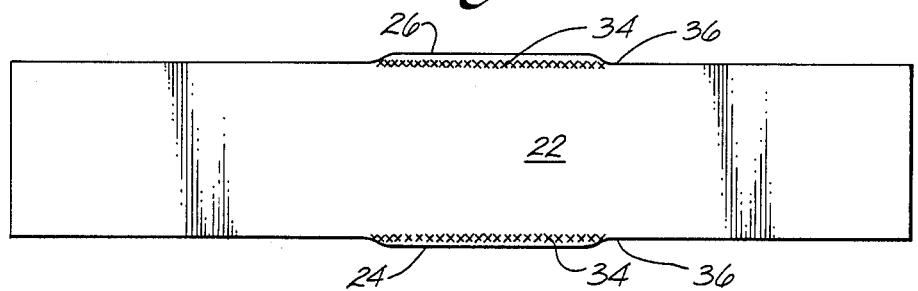
Figure 2C:
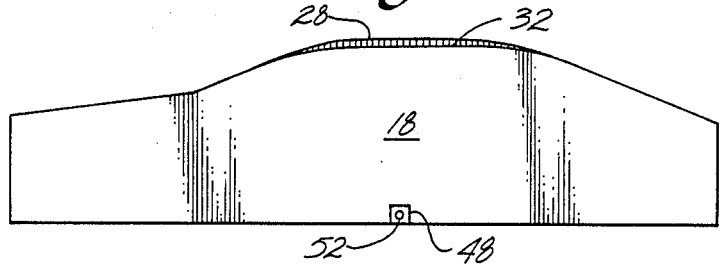
Figure 3:
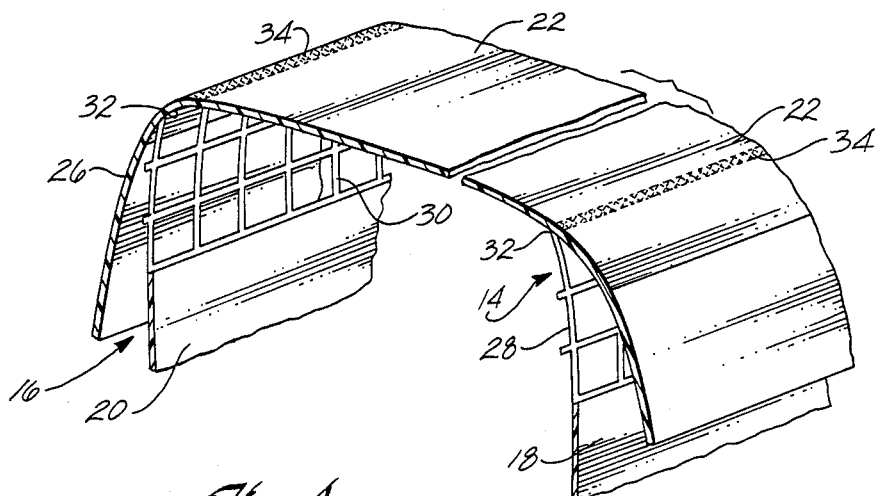
FIG. 3 is enlarged perspective view taken along line 3—3 of FIG. 1.

Referring now to FIGS. 1-3, the first embodiment of a protective cover 10 in accordance with the invention is formed of a plurality of panels of vapor-impermeable material forming an enclosure 12 for surrounding an object such as an automobile. The cover includes at least one vent 14 preferably a plurality of vents 14, 16. In this embodiment, the vents are formed along the seam line between the side panels 18, 20 and the top panel 22. The top panel 22 is formed with two elongated integral flaps 24, 26 formed along the side edges thereof. Each of these flaps overlies and closes an elongated vent 28, 30 formed along the top edge of each of the panels 18, 20. Since the vents 28, 30 may close if they are simply a slit between the top and side panels, it is preferable to insert an open mesh or screen material in the vent 28, 30. The screen is sewed to the top edge 32 of each side panel and to the top panel 22 at a line 34 along the juncture of flap 24, 26 with the edge 36 of the panel. This stitch line 34 forms a live hinge for the flaps 24, 26 so that they lie flatly and evenly close the vents 28, 30. Optionally, a further vent 35 having an elongated flap 37 convering the vent 35 may be formed at a position corresponding to the juncture of the windshield and the hood of the automobile to be stored as illustrated in FIG. 1.

The cover can be made out of one panel or more than one panel. If the cover is made out of only three panels, such as the top and side panels, it would tend to gather around the sloped surfaces of the windshield, hood and trunk of a vehicle. It is therefore preferred to provide separate panels 40, 42, 44, 46 adjacent the front and rear bumpers of the vehicle to provide a smooth contour for the cover 10. The cover can also be provided with a set of reinforced patches 48, 50 containing a grommet hole 52 for receiving a locking cable, not shown.

Figure 4:
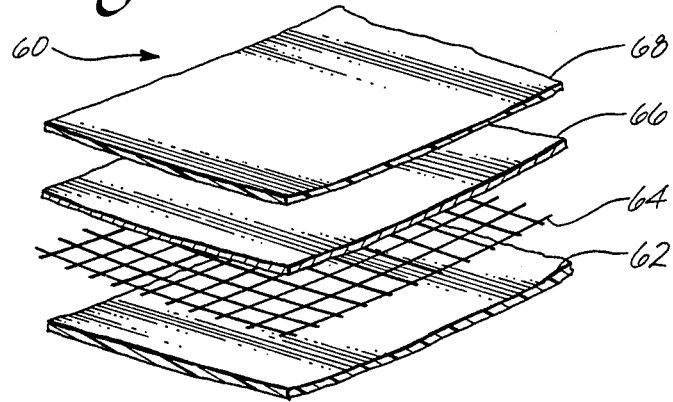
FIG. 4 is an exploded view in perspective of a first laminate for use in forming the vented, protective cover of the invention with the lamina films partially separated.
Figure 5:
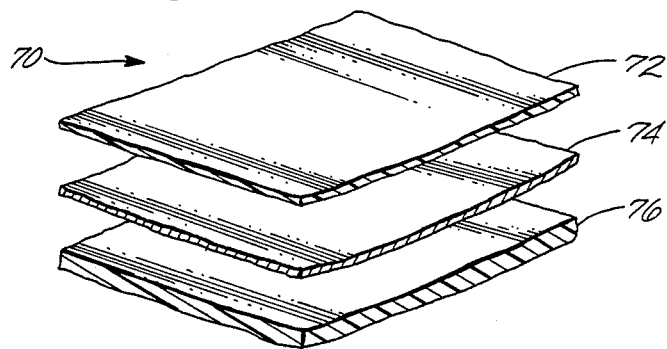
FIG. 5 is an exploded view in perspective of another laminate for use in the invention.

The cover can be formed of any lightweight flexible, vapor-impermeable material. Preferably, the material contains a metal layer in order to reflect away all of the harmful radiation including ultraviolet and infrared. The film preferably contains a smooth inner surface in order to prevent scratching and deterioration of the finish of automobiles. A very good material is a self-lubricating polyolefin film such as polyethylene or polypropylene. Optionally, a layer of woven or non-woven cushioning material such as cotton felt or cotton fabric may be attached to the inside film. Some thin sheets tend to gather or wrinkle forming pockets which collect dirt or moisture under the surface. One way to prevent this is to incorporate a reinforcing fiber as a layer in the film. The reinforcement fiber can be random, woven, or non-woven materials. A preferred reinforcement material is a woven, open scrim formed of either an inorganic material such as fiberglass or an organic material such as Nomex which is a nylon-type, linear polyamide. Suitable materials are illustrated in FIGS. 4 and 5. The film 60 illustrated in FIG. 4 is formed of four layers. The inner layer is a smooth, self-lubricating polyolefin film 62 such as polyethylene, suitably having a thickness from 0.5 mils to 5 mils. When the film is thin, of the order of 1 mil, a scrim layer 64 may be provided for reinforcement. The top two layers are formed of an outer plastic film 66 having a metalized layer 68 on its inner surface. The outer film can be formed of a wide variety of resins such as polyester (Mylar), polyamide (nylon) or again a polyolefin such as polyethylene or polypropylene. The outer film can have a thickness of the order of 0.5 to 10 mils suitably about 4 mils. The outer film contains a thin layer of metal which can be applied by vapor deposition or by laminating a layer of a metal such as aluminum to a surface of the layer. It is preferred to use thermoplastic films such as polyethylene, nylon or Mylar since the laminate can be formed by heat welding or solvent welding techniques and the film can be adhered to other surfaces by thermowelding.

FIG. 5 illustrates another laminate. Film 70 suitable for use in forming the cover of the invention includes an outer Mylar polyester layer 72 containing a thin, metalized inner surface layer 74 followed by a fairly thick inner layer 76 having a thickness of the order of 5-7 mils. A thick inner layer of polyethylene provides stiffness to the film and obviates the necessity to provide a separate scrim layer.

A further embodiment of the vented car cover 80 is illustrated in FIGS. 6 and 7. In this cover 80 the vents are provided as elongated flaps 82 formed along the seams 84 between the top and side panels and along the top 86 and along the side panels 88. The flaps 82 are formed by overlapping the edges 90, 92 of adjacent panels by a series of cross stitches 94 spaced along the overlapping edges. The unsecured lengths 96 between the stitches forms a set of flaps which are normally closed but which will open in response to the development of internal pressure from evaporated moisture which allows the vapor to vent from the cover.

A further embodiment of a car cover 100 is illustrated in FIGS. 8–10. In this car cover 100 the vents 102 are provided as a series of spaced vents 102 provided along the top panel 104 and the side panels 106. Each of the vents includes a venthole or aperture 108 covered by a flap 110. The apertures may have varied configurations such as the triangular aperture 108 shown in FIG. 9 or the circular aperture 112 shown in FIG. 10. The flap 110 may be sewn along edge 114 as shown in FIG. 9 or along three edges 116, 118, 120 as shown in FIG. 10. The apertures may be open or may be filled with screen or mesh as previously described. A suitable size for the apertures is from about 0.5 inch to 2 inches, suitably about 1 to 1½ inches long each dimension. The flaps will be positioned to face on a downward slope depending on the panel. Again, the vent-flap assemblies serve as unidirectional valves which prevent entrance of any abrasive particle or moisture through the cover into the interior but yet the flaps readily open to allow release of moisture.

Another feature of the invention would be to color code the interior or exterior films to provide a coding system making it possible for parking lot attendants to quickly select the correct cover for the automobile depending on its size and shape and also to retrieve, return and reshelve these car covers. The cover of the inention which combines selective venting with vapor-impermeable materials and reflective materials provides a fully waterproof protective cover which facilitates evaporation of mositure or vapors that could harm the finish when trapped underneath a cover. Yet the cover of the invention protects the automobile from damage from heat generated by the sun or ultraviolet rays from the sun and also protects the automobile from moisture, rains, ocean salts, spray, fog, acid rain, aggressive gases in smog such as sulfuric or nitric, and dirt, dust, tree leaves, sap, bird droppings, etc.

A car cover prepared in accordance the invention was tested in direct sunlight. The cover maintained the car at a cool temperature. When the cover was removed from the vehicle, the temperature rose 40 degrees F.

The car cover of the invention offers the consumer total protection of the valuable automobile or other valuable asset. The car cover of the invention is attractive and inexpensive and can be quickly and neatly folded into a small package to be carried with the vehicle. The car cover is very light and is easily deployed and secured to the vehicle.

It is to be realized that only preferred embodiments of the invention have been described and that numerous substitutions, modifications and alterations are permissible without departing form the spirit and scope of the invention as defined in the following claims.

I claim:

1. A lightweight, protective cover for a shaped object comprising:
   a plurality of panels of lightweight, vapor-impermeable, sheet material;
   means securing the edges of the panels to form an enclosure;
   at least one vent opening in the enclosure formed by overlapping two edges of adjacent panels, and flap means formed by intermittently forming a series of spaced lines connecting the overlapped portions of the panels whereby entry of water from the outside surface through the vent opening is prevented while water vapor can be selectively exhausted through the openings between the lines of attachment.

2. A cover according to claim 1 in which the lines of attachment are perpendicular to the edge of the panel.

3. A cover according to claim 1 in which the edges of the panels are essentially horizontal and the edge of the upper panel overlaps the edge of the lower panel.

4. A cover according to claim 1 in which the panels are formed from a sheet of lightweight material having an outer reflective surface and a smooth inner surface.

5. A cover according to claim 2 in which the lines of attachment are formed by stitches.

6. A cover according to claim 1 in which the panels comprise a top panel and two side panels having their upper edges secured to the outer edges of the top panel and vent openings being formed along the intersections of the top panel and the two side panels.

7. A cover according to claim 6 further including locking means formed along a bottom edge of a side panel.

8. A cover according to claim 6 in which the panels are shaped to form an enclosure for an automobile.

9. A cover according to claim 1 in which the sheet material is a laminate including top and bottom layers of synthetic resins and an intermediate layer of reflective metal.

10. A cover according to claim 9 in which the laminate further includes an intermediate layer of fiber reinforcement.

11. A cover according to claim 10 in which the fiber reinforcement is a scrim material.

12. A cover according to claim 11 in which the resin layers are thermoplastic resins.

13. A cover according to claim 12 in which the resin layers are selected from linear polyesters or polyolefins.

14. A cover according to claim 13 in which the linear polyester is polyethylene terephthalate and the polyolefin is polyethylene.

15. A cover according to claim 12 in which the outer facing resin layer is transparent and the inner layer is color coded to a color characteristic of the shape or size of the cover.

16. A cover according to claim 9 further including a layer of soft, cushioning material attached to the inner layer of resin.

* * * * *